United States Patent [19]

Engel

[11] Patent Number: 5,340,190
[45] Date of Patent: Aug. 23, 1994

[54] AIR-FLOW MANAGEMENT DEVICE
[75] Inventor: Don J. Engel, Sarepta, La.
[73] Assignee: R.O.A.D. Industries, Inc., Sarepta, La.
[21] Appl. No.: 987,013
[22] Filed: Dec. 7, 1992

Related U.S. Application Data

[63] Continuation-in-part of Ser. No. 824,062, Jan. 22, 1992, abandoned, which is a continuation-in-part of Ser. No. 643,830, Jan. 22, 1991, abandoned.

[51] Int. Cl.$^5$ .............................................. B62D 35/00
[52] U.S. Cl. ..................... 296/180.1; 296/180.2; 296/180.3; 296/180.4; 296/180.5
[58] Field of Search ................. 296/180.1–180.5; 180/903

[56] References Cited

U.S. PATENT DOCUMENTS

| | | | |
|---|---|---|---|
| 3,695,673 | 10/1972 | Meadows | 296/180.2 |
| 3,947,065 | 3/1976 | Geiger | 296/180.3 |
| 4,840,422 | 6/1989 | Engel | 296/180.4 |
| 4,957,325 | 9/1990 | Engel | 296/180.2 |

FOREIGN PATENT DOCUMENTS

| | | | |
|---|---|---|---|
| 0044746 | 1/1982 | European Pat. Off. | 296/180.4 |
| 3044613 | 1/1982 | Fed. Rep. of Germany | 296/180.2 |
| 0095264 | 6/1982 | Japan | 296/180.2 |
| 0471342 | 9/1937 | United Kingdom | 296/180.1 |

Primary Examiner—Dennis H. Pedder
Attorney, Agent, or Firm—Timmons & Kelly

[57] ABSTRACT

An air-flow management device mountable on an upper, forward portion of a vehicle having either a cab and a van or a tractor/cab semitrailer is disclosed, having a base, a first vertically upright airfoil secured to the base on the right extending from slightly above the cab to substantially the height of the van or semitrailer, a second vertically upright airfoil secured to the base on the left extending from slightly above the cab to substantially the height of the van or semitrailer, a first surface positioned behind the first airfoil to deflect the air-flow toward an exit opening at the right of the vehicle and a second surface positioned behind the second airfoil to deflect the air-flow toward an exit opening at the left of the vehicle. In one arrangement there is an inclined third surface joining the first surface with the second surface to deflect the air-flow in an upward direction, a first horizontal brace member is secured to the first airfoil, a second horizontal brace member is secured to the second airfoil, and a third airfoil is mounted transversely between the first and second airfoil assemblies in front of the third surface.

10 Claims, 4 Drawing Sheets

AIR-FLOW MANAGEMENT DEVICE

DESCRIPTION

This application is a continuation-in-part of U.S. Ser. No. 07/824,062 filed Jan. 22, 1992, that in turn is a continuation-in-part of U.S. Ser No. 07/643,830 filed Jan. 22, 1991, now abandoned.

TECHNICAL FIELD

The present invention relates generally to air-flow deflectors and diverters for vehicles, and in one of its aspects to airfoils mountable on a vehicle for reducing the effect of wind resistance.

Vehicles such as vans and tractor-trailer rigs present large flat surfaces on their upper, forward portions. In recent years, it has become common practice to mount an air-flow deflector on top of the cab or directly on the trailer portion of the vehicle in order to present a more streamlined figure to the air-flow, reducing air resistance and improving gas mileage.

BACKGROUND ART

Many different types of air-flow deflectors have been proposed for use with tractor-trailer rigs in order to reduce the effects of wind resistance. Typical of such deflectors are the ones shown by Meadows (U.S. Pat. No. 3,695,673) and Geiger (U.S. Pat. No. 3,947,065).

Air-flow deflectors have been combined with air grilles for greater control of the air-flow as shown in the two Engel patents (U.S. Pat. No. 4,840,422 and U.S. Pat. No. 4,957,325). The patent to Landry (U.S. Pat. No. 4,103,957) shows another attempt to develop more of an air management approach, this time by the use of an airfoil which directs some of the air-flow upward and uses part of the air-flow to create a vortex between the airfoil and the trailer.

DISCLOSURE OF THE INVENTION

An air-flow management device according to the present invention for mounting on the upper, forward portion of a vehicle, includes a first vertically inclined upright airfoil positioned in front of the right half of the upper, forward portion and a second vertically inclined upright airfoil positioned in front of the left half of the upper, forward portion. A first and second surface, positioned behind the first and second airfoils respectively, deflect the air-flow to exits at the right and left sides of the vehicle respectively. The first and second airfoils are each of such a shape and position with respect to the deflecting surfaces as to produce a vortex causing the speed of the air-flow exiting the device to be substantially greater than the speed of the air-flow entering the device.

In a preferred arrangement, a third centrally located surface deflects the air-flow in an upward direction. The third surface joins the first and second surfaces and cooperates with them to form an air deflector. The first and second airfoils are secured to a base, and a first brace member and a second brace member secure the first and second airfoils respectively, and both are secured to the air deflector. In one arrangement, a third airfoil is horizontally supported for arcuate displacement between the first and second airfoil assemblies. In such arrangement, the third airfoil is of such a shape and position with respect to the deflecting surfaces as to produce a vortex causing the speed of the air-flow exiting the device thereat to likewise be substantially greater than the speed of the air-flow entering the device. The air deflector is secured to the base in one arrangement.

These and other objects, advantages and features of this invention will be apparent from the following description taken with reference to the accompanying drawings, wherein is shown the preferred embodiments of the invention.

BEST MODE FOR CARRYING OUT THE INVENTION

Figure 1:
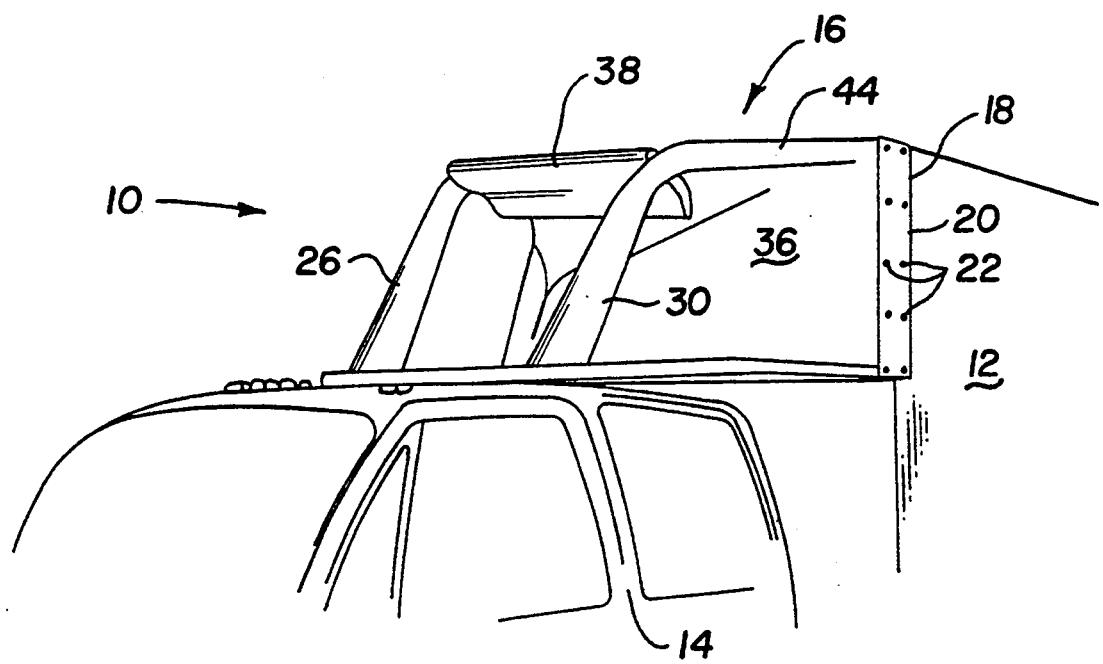
FIG. 1 is a partial pictorial view of a vehicle with a cab and trailer and having an air-flow management device according to the present invention.

Referring now to the drawings, and in particular to FIG. 1, there is shown a vehicle referred to generally by reference numeral 10 that includes a van trailer or van body 12 which is pulled by a cab 14. An air-flow management device generally designated 16 according to the present invention is mounted on an upper, forward portion 18 of the vehicle by means of connector plates 20, one attached to each side of trailer 12 by bolts 22.

Figure 3:
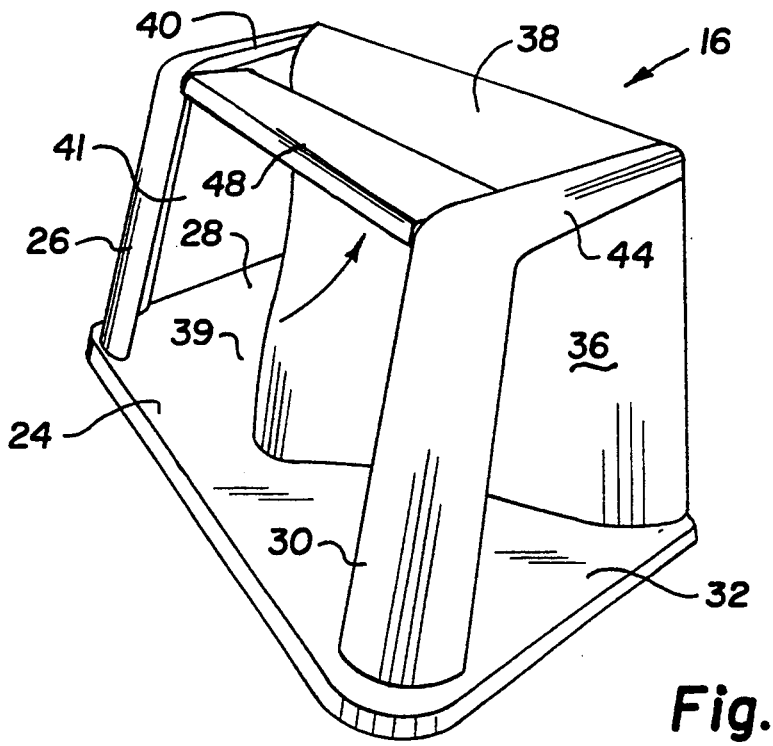
FIG. 3 is a perspective view of the air-flow management device of FIG. 1.
Figure 4:
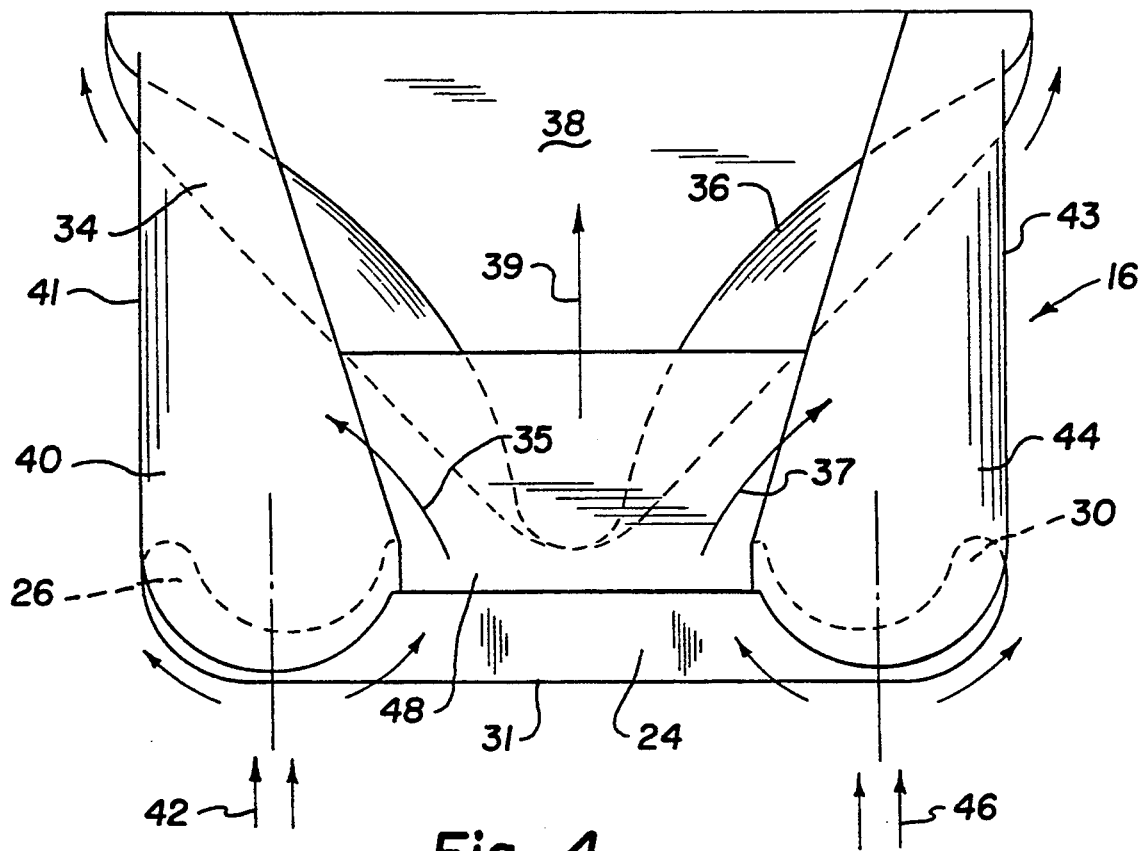
FIG. 4 is a plan view of the air-flow device hereof.
Figure 5:
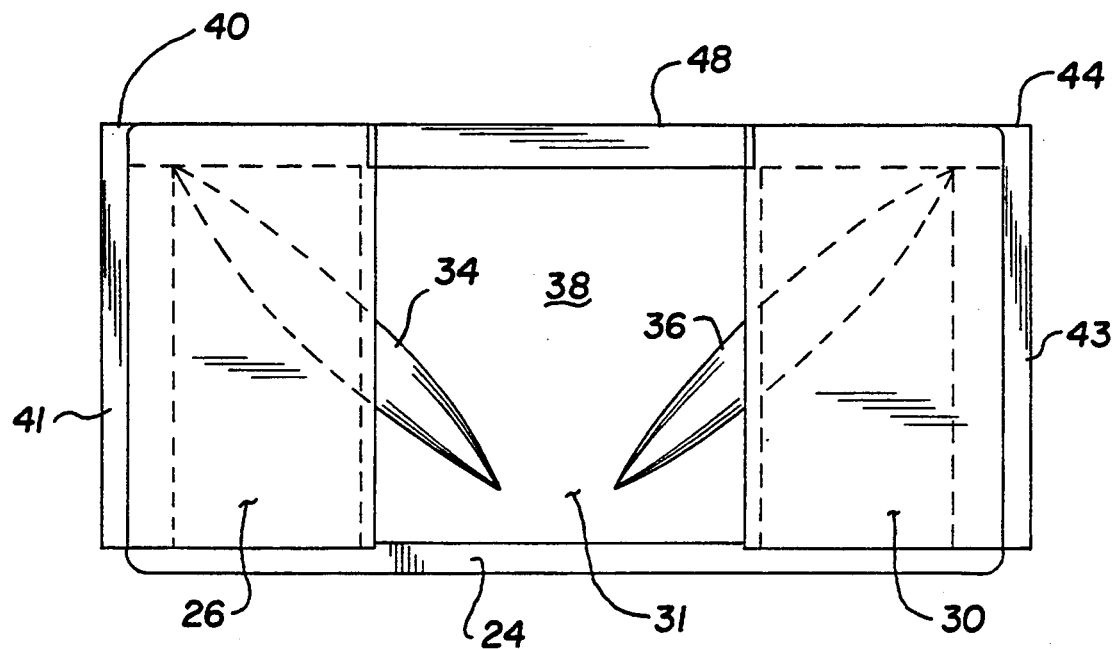
FIG. 5 is a front elevation view of the device hereof.

Referring also to FIGS. 3–5 the air-flow management device 16 includes a base or adapter plate 24, a first vertically oriented upright airfoil 26 secured to the base, positioned on the driver's right 28 of forward portion 18, and a second vertically oriented upright airfoil 30 also secured to the base and positioned on the driver's left 32 of the forward portion. A first shaped or warped surface 34 is positioned behind the first airfoil to cooperate in forming an intervening passage and to deflect air-flow 35 to the right of the vehicle toward exit 41. A second shaped or warped surface 36 is positioned behind the second airfoil to cooperate in forming an intervening passage and to deflect air-flow 37 to the driver's left of the vehicle toward exit 43. A third surface 38 deflects air-flow 39 in an upward direction and joins first surface 34 with second surface 36. The three surfaces cooperate to form an air deflector with the warped surfaces providing an aerodynamic smooth area transition.

A first brace member 40 comprises a horiziontial airfoil and is secured to the air deflector where surface 34 joins surface 38 and is also secured to first airfoil 26 for bracing the airfoil against substantial air-flow 35 and 42. Similarly, a second brace member 44 comprises a horizontal airfoil and is secured to the air deflector where surface 36 joins surface 38. It is also secured to second airfoil 30 for bracing against substantial air-flow 37 and 46. In this manner first brace member 40 cooperates with first airfoil 26 to form a right side airfoil assembly, while second brace member 44 cooperates with second airfoil 30 to form a left side airfoil assembly. A third airfoil 48 comprising a cannard wing is mounted between the right and left airfoil assemblies in front of third surface 38. Brace airfoil members 40 and 44 serve to stablize the device as well as being integral to management of the air flow passing through the device. Airfoil 48 also provides a vertical force component that may be used as a vehicle stabilizer.

Figure 2:
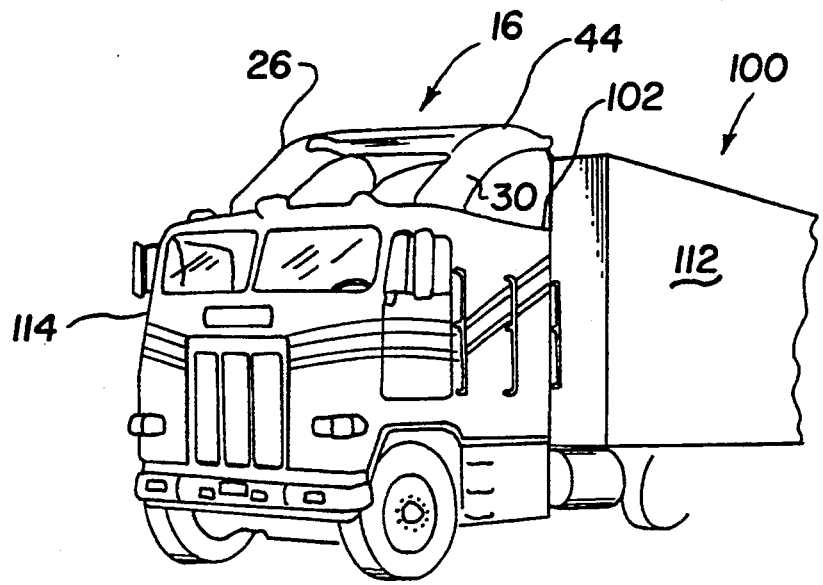
FIG. 2 is a partial pictorial view of a tractor semi-trailer having an air-flow management device according to the present invention mounted on the cab of the tractor.

As shown in FIG. 2, a tractor semitrailer according to the present invention is referred to generally by reference numeral 100. Tractor semitrailer 100 includes trailer 112 pulled by tractor 114. Air-flow management device 16 is mounted directly on mounting surface 102, in this case the top of tractor cab 114. In such an arrangement, where the generally upright first and second airfoils 26 and 30 respectively are each of such a shape and position that the speed of the air-flow exiting the device is substantially greater than the speed of the air-flow entering the device, the air stream can "jump the gap" between the tractor cab and the semitrailer rather than causing inefficient eddies or vortexes behind the cab.

Figure 6:
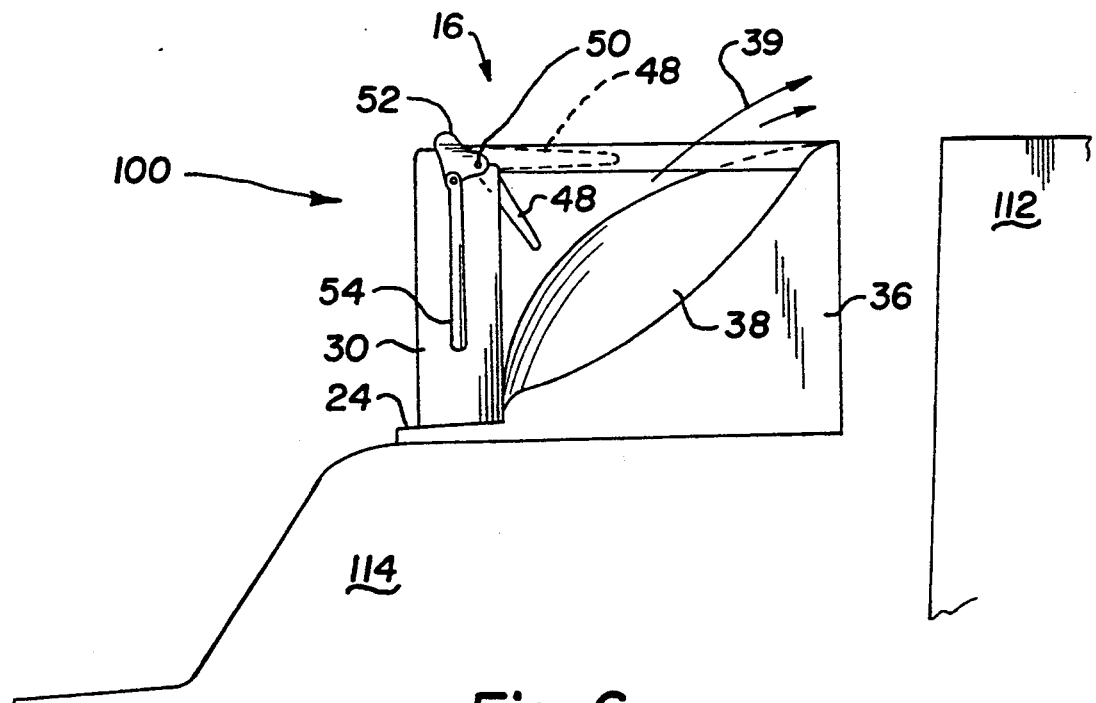
FIG. 6 is a side elevation view of the device hereof showing a rotational mechanism for the third airfoil of the present invention.

Referring also to FIG. 6, in a preferred arrangement, third airfoil 48 is rotatably mounted by affixing it about a tubular shaft 50 which is turned by bell shaped crank 52. Bell crank 52 is controlled by rod 54 from cab 14 where cab 14 is fixed with respect to trailer 12.

Third airfoil 48 can be given a shape similar to that of the first and second airfoil to add more forward force component or it can have a longer and flatter cross section to act as an air-flow control damper for the air-flow past the inside of the other airfoils. It can also be of such a shape and position with respect to the deflector surface to cause the speed of the air-flow exiting the top of the device to be substantially greater than the speed of the air-flow entering the device.

The airfoils can be constructed in many different ways such as aluminum over a honeycomb structure or structural foam with some kind of cover. Wood could even make a suitable structure.

In a semitrailer truck arrangement or other arrangement where the cab can turn with respect to the trailer, air-flow management device 16 would need to be raised or elevated to give clearance for the cab to move or would have to be mounted on the cab, affording clearance in the back for the trailer to turn. For an understanding of the venturi effect phenomena associated with the effective operating structure of the air-flow manangement device 16 hereof, reference is made specifically to FIGS. 7-9. The streamlines 56 plotted in FIG. 9 assume uniform flow, i.e. equal pressure density, etc., whereby a nozzle or venturi effect is produced. As a consequence of the varying area, the flow received at entrance 31 is caused to incur restrictions A and B while the discharging flow at exit 41 incurs a boundary compression. A similar boundary compression occurs at exit 43. As one tracks the streamlines through the device, the increased velocity is evidenced by the lines getting closer together. The nature of the vortexes is such that they promote increased external velocity and a lower to negative internal pressure. By effecting vortices in the manner hereof, boundary layer compression or expansion and separation in controlled boundary layer effects can be readily attained.

Figure 7:
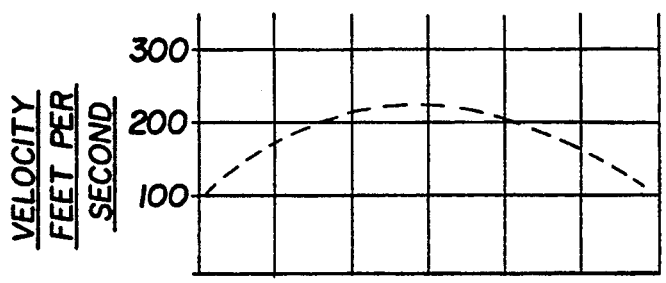
FIG. 7 and 8 are graphical representations of the flow properties through the device hereof.
Figure 8:
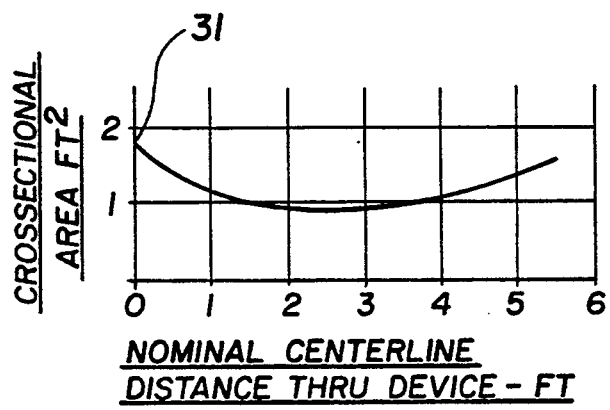
Figure 9:
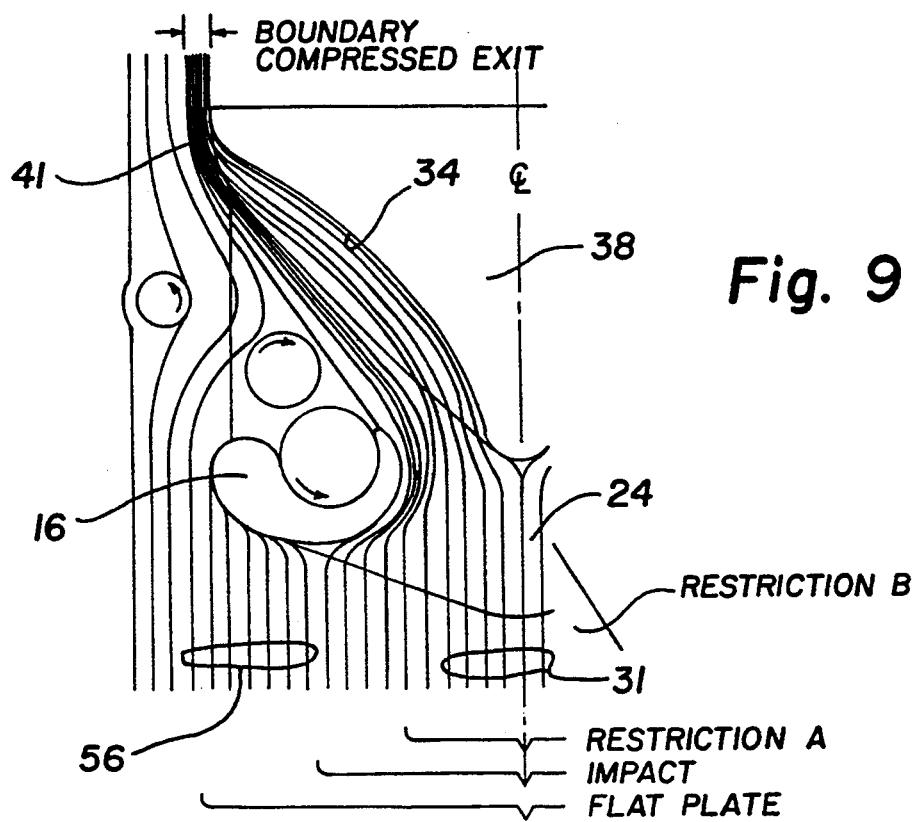
FIG. 9 is a diagrammatic representation of the streamline flow pattern through one half the device hereof.

The foregoing can be further understood by reference to FIGS. 7 and 8 providing graphical representations of variable crossectional area. As shown in FIG. 8 one axis is the nominal centerline distance through the three main sections of the device in linear feet and the other the total crossectional area at various points along that path in square feet. FIG. 7 illustrates a curve representing nominal variable air velocity through the device in feet per second with a vehicle speed assumed to be about 60 MPH or 88 FPS. The velocity curve of FIG. 7 is based upon geometry alone without taking into consideration any of the effects of the controlling vortices generated by the airfoil elements 26, 30 and 48. Critical to operation of the device 16 hereof as should now be understood are the vertical airfoils 26 and 30 and the airfoil 48 when utilized.

From the foregoing it will be seen that this invention is one well adapted to attain all of the ends and objects herein above set forth, together with other advantages which are inherent to the apparatus.

It will be understood that certain features and subcominations are of utility and may be mployed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

I claim:

1. An air-flow management device mountable on an upper, forward portion of a vehicle, comprising in combination:

means defining an entrance opening at the forward portion of the vehicle through which entering air flow can be received;

a first substantially imperforate and generally upright airfoil means located at said entrance on the right half of the forward portion of the vehicle and standing substantially isolated in the flow path of the received air thereat for causing a vortex of received air flow to be generated thereabout;

a second substantially imperforate and generally upright airfoil means positioned on the left half of the forward portion of the vehicle and standing substantially isolated in the flow path of the received air thereat causing a vortex of received air flow to be generated thereabout;

means defining a plurality of exit openings in communication with said entrance and through which air flow exits the device;

first surface means providing a selectively warped surface positioned behind the first airfoil means and cooperating with said first airfoil means to define a first intervening flow passage in communication with said entrance for providing a venturi effect while deflecting entering air-flow received at said entrance to an exit opening on the right of the vehicle; and second surface means providing a selectively warped surface positioned behind the second airfoil means and cooperating with said second airfoil means to define a second intervening flow passage in communication with said entrance for producing a venturi effect while deflecting air-flow received at said entrance to an exit opening on the left of the vehicle, wherein the first and second airfoil means in cooperation with said first and second surface means cause the air-flow to exit the device through said exit openings at a substantially greater velocity than the velocity of the received air-flow entering the device through said entrance.

2. An air-flow management device according to claim 1 further including:
   a first brace member secured to the first surface means and to the first airfoil means; and
   a second brace member secured to the second surface means and to the second airfoil means.

3. An air-flow management device according to claim 2 wherein the first brace member cooperates with the first airfoil means to form a right side airfoil assembly and the second brace member cooperates with the second airfoil means to form a left side airfoil assembly, and further including:
   a third airfoil means transversely mounted between the first and second airfoil assemblies; and
   third surface means joining the first and second surface means and positioned behind said third airfoil means to deflect the received air-flow thereat in an upward direction wherein the first, second and third surface means cooperate to form an air deflector.

4. An air-flow management device according to claim 1 further including:
   a third surface means joining the first and second surface means, to deflect the air-flow in an upward direction, wherein the first, second and third surface means cooperate to form an air deflector; and
   a third airfoil means positioned in front of the third surface means.

5. An air-flow management device mountable on an upper, forward portion of a vehicle, comprising in combination:
   a base;
   mean defining an entrance opening above said base at the forward portion of the vehicle through which air flow can be received;
   a first substantially imperforate and generally upright airfoil means secured to the base at said entrance on the right half of the forward portion of the vehicle and standing substantially isolated in the flow path of the received air thereat for causing a vortex of received air flow to be generated thereabout;
   a second substantially imperforate and generally upright airfoil means secured to the base at said entrance on the left half of the forward portion of the vehicle and standing substantially isolated in the flow path of the received air thereat for causing a vortex of received air flow to be generated thereabout;
   means defining a plurality of exit openings in communication with said entrance through which received air flow exits the device;
   first surface means providing selectively warped surface positioned behind the first airfoil means and cooperating with said first airfoil means to define a first intervening flow passage in communication with said entrance for producing a venturi effect while deflecting air-flow received at said entrance toward an exit opening on the right of the vehicle;
   second surface means providing a selectively warped surface positioned behind the second airfoil means and cooperating with said second airfoil means to define a second intervening flow passage in communication with said entrance for producing a venturi effect while deflecting air-flow received at said entrance toward an exit opening on the left of the vehicle;
   third surface means merging the first and second surface means to deflect received air-flow in an upward direction toward an exit, wherein the first, second and third surface means cooperate to form an air deflector;
   a first brace member secured to the air deflector and the first airfoil means and cooperating with the first airfoil means to form a right side airfoil assembly;
   a second brace member secured to the air deflector and the second airfoil means and cooperating with the second airfoil means to form a left side airfoil assembly; and
   a third substantially imperforate airfoil means transversely mounted between the first and second airfoil assemblies in front of the third surface means wherein at least said first and second airfoil means in cooperation with said first and second surface means cause the air-flow to exit the device through said exit openings at a substantially greater velocity than the received air-flow entering the device through said entrance.

6. An air-flow management device according to claim 5 wherein said third airfoil means is of such shape and position as to cause a vortex to be produced thereabout whereby airflow over said third surface means has a substantially greater velocity at the exit opening thereat than the received air-flow entering the device through said entrance.

7. An air-flow management device according to claim 5 wherein the air deflector is secured to said base.

8. An air-flow management device according to claim 7 wherein the third airfoil means is rotatably mounted for arcuate displacement.

9. An air-flow management device according to claim 3 wherein the third airfoil means is rotatably mounted for arcuate displacement.

10. An air-flow management device according to claim 9 in which the arcuate position of said third airfoil means is presettably displaceable manually.

* * * * *